(12) United States Patent
Zhang et al.

(10) Patent No.: US 12,298,621 B2
(45) Date of Patent: May 13, 2025

(54) LIGHT-EMITTING SUBSTRATE AND MANUFACTURING METHOD THEREOF, BACKLIGHT MODULE AND DISPLAY APPARATUS

(71) Applicants: Hefei BOE Ruisheng Technology Co., Ltd., Anhui (CN); BOE TECHNOLOGY GROUP CO., LTD., Beijing (CN)

(72) Inventors: Bing Zhang, Beijing (CN); Jianwei Qin, Beijing (CN); Xiao Wang, Beijing (CN); Kangli Wang, Beijing (CN); Liang Gao, Beijing (CN)

(73) Assignees: HEFEI BOE RUISHENG TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/247,394

(22) PCT Filed: Jun. 30, 2022

(86) PCT No.: PCT/CN2022/102840
§ 371 (c)(1),
(2) Date: Mar. 30, 2023

(87) PCT Pub. No.: WO2024/000411
PCT Pub. Date: Jan. 4, 2024

(65) Prior Publication Data
US 2024/0369877 A1 Nov. 7, 2024

(51) Int. Cl.
*G02F 1/13357* (2006.01)
*F21V 8/00* (2006.01)
*G02F 1/1335* (2006.01)

(52) U.S. Cl.
CPC ..... *G02F 1/133606* (2013.01); *G02B 6/0051* (2013.01); *G02B 6/0073* (2013.01); *G02B 6/0076* (2013.01); *G02B 6/0091* (2013.01); *G02F 1/133603* (2013.01); *G02F 1/133612* (2021.01)

(58) Field of Classification Search
CPC ......... G02F 1/133605; G02F 1/133606; G02F 1/133612; G02B 6/0051; G02B 6/0073; G02B 6/0076; G02B 6/0091
See application file for complete search history.

(56) References Cited

U.S. PATENT DOCUMENTS

2012/0243261 A1\* 9/2012 Yamamoto ........ G02F 1/133603
362/613

FOREIGN PATENT DOCUMENTS

| CN | 102694106 A | 9/2012 |
| CN | 109843001 A | 6/2019 |
| CN | 110398857 A | 11/2019 |

(Continued)

*Primary Examiner* — Mary Ellen Bowman
(74) *Attorney, Agent, or Firm* — XSENSUS LLP

(57) ABSTRACT

A light-emitting substrate includes a circuit board, a plurality of light-emitting devices, a reflective layer and a support layer. The plurality of light-emitting devices are disposed on the circuit board. The reflective layer is disposed on the circuit board; the reflective layer is provided with a plurality of openings therein, and a light-emitting device is located in an opening. The support layer is disposed on a side of the circuit board away from the reflective layer.

19 Claims, 10 Drawing Sheets

(56) References Cited

FOREIGN PATENT DOCUMENTS

| CN | 110534020 A | 12/2019 |
|----|-------------|---------|
| CN | 211979375 U | 11/2020 |
| CN | 215833737 U | 2/2022 |
| CN | 114280847 A | 4/2022 |
| CN | 114428421 A | 5/2022 |

* cited by examiner

LIGHT-EMITTING SUBSTRATE AND MANUFACTURING METHOD THEREOF, BACKLIGHT MODULE AND DISPLAY APPARATUS

CROSS-REFERENCE TO RELATED APPLICATION

This application is a national phase entry under 35 USC 371 of International Patent Application No. PCT/CN2022/102840, filed on Jun. 30, 2022, which is incorporated herein by reference in its entirety.

TECHNICAL FIELD

The present disclosure relates to the field of display technologies, and in particular, to a light-emitting substrate and a manufacturing method thereof, a backlight module and a display apparatus.

BACKGROUND

With the development of light-emitting diode technologies, a technology in which light-emitting diodes (LEDs) in a sub-millimeter level or even micro-meter level are served as a backlight source has been widely used. Not only can an image contrast of a product (e.g., a liquid crystal display (LCD) apparatus) using the backlight source reach a level of organic light-emitting diode (OLED) display products, but also the product can keep having technical advantages of the liquid crystal display. As a result, a display effect of an image is improved, which provides a better visual experience for users.

SUMMARY

In an aspect, a light-emitting substrate is provided. The light-emitting substrate includes a circuit board, a plurality of light-emitting devices, a reflective layer and a support layer. The plurality of light-emitting devices are disposed on the circuit board. The reflective layer is disposed on the circuit board; the reflective layer is provided with a plurality of openings therein, and a light-emitting device in the plurality of light-emitting devices is located in an opening in the plurality of openings. The support layer is disposed on a side of the circuit board away from the reflective layer.

In some embodiments, a material of the support layer and a material of the reflective layer are same; and/or a thickness of the support layer and a thickness of the reflective layer are substantially same.

In some embodiments, a thickness of the reflective layer is in a range of 40 μm to 60 μm, inclusive, and a thickness tolerance of the reflective layer is in a range of −2 μm to 2 μm, inclusive; and/or a thickness of the support layer is in a range of 40 μm to 60 μm, inclusive, and a thickness tolerance of the support layer is in a range of −2 μm to 2 μm, inclusive.

In some embodiments, the light-emitting substrate further includes a barrier wall and an encapsulation layer. The barrier wall is disposed on a surface of the reflective layer away from the circuit board; an orthographic projection of the barrier wall on the circuit board is located within an orthographic projection of the reflective layer on the circuit board, and the barrier wall defines a plurality of sub-regions. The encapsulation layer is disposed on a side of the circuit board away from the support layer and covering at least the plurality of light-emitting devices.

In some embodiments, the encapsulation layer includes a plurality of encapsulation portions arranged at intervals, each encapsulation portion is located in a sub-region in the plurality of sub-regions, and a surface of the encapsulation portion away from the circuit board is substantially flush with a surface of the barrier wall away from the circuit board.

In some embodiments, the encapsulation layer further includes an encapsulation sub-layer, the encapsulation sub-layer is disposed on a side of the plurality of encapsulation portions away from the circuit board, and the encapsulation sub-layer covers the plurality of encapsulation portions and the barrier wall.

In some embodiments, the barrier wall includes a plurality of first sub-portions that extend along a first direction and are arranged at intervals along a second direction, and the first direction and the second direction intersect.

In some embodiments, the barrier wall further includes a plurality of second sub-portions that extend along the second direction and are arranged at intervals along the first direction.

In some embodiments, a reflectivity of the barrier wall is greater than or equal to 85%.

In some embodiments, a material of the barrier wall includes white adhesive and/or plastic.

In some embodiments, the circuit board includes a base, and circuit traces and a plurality of pads that are disposed on the base, at least two pads in the plurality of pads are located in the opening in the reflective layer.

In another aspect, a method for manufacturing a light-emitting substrate is provided. The manufacturing method of the light-emitting substrate includes: fabricating a circuit board; synchronously forming a reflective film and a support layer on two opposite sides of the circuit board, respectively; and patterning the reflective film such that a plurality of openings are formed in the reflective film to form a reflective layer.

In some embodiments, synchronously forming a reflective film and a support layer on two opposite sides of the circuit board, respectively, includes: pressing the reflective film and the support layer with the circuit board by a lamination process.

In some embodiments, pressing the reflective film and the support layer with the circuit board by the lamination process, includes:
providing two films to be pressed, the two films to be pressed each including a substrate, and a first protective film and a second protective film that are disposed on two opposite sides of the substrate, respectively; removing first protective films of the two films to be pressed; synchronously pressing the two films to be pressed whose first protective films are removed on the two opposite sides of the circuit board, respectively, so that two substrates of the two films to be pressed are bonded with the circuit board; and removing second protective films of the two films to be pressed; in the two substrates bonded with the circuit board, one substrate forms the reflective film, and another substrate forms the support layer.

In some embodiments, synchronously pressing the two films to be pressed whose first protective films are removed on the two opposite sides of the circuit board, respectively, so that the two substrates of the two films to be pressed are bonded with the circuit board, includes:
placing the circuit board between the two films to be pressed whose first protective films are removed; synchronously pre-pressing and attaching the circuit board and the two substrates of the two films to be pressed; and synchronously pressing the circuit board and the two substrates on two sides thereof that have been pre-pressed and attached in vacuum.

In some embodiments, before providing the two films to be pressed, the manufacturing method further includes: fabricating the two films to be pressed.

Fabricating each film to be pressed includes: providing the first protective film and the second protective film; forming the substrate on the first protective film; and pressing the first protective film, the substrate and the second protective film by a lamination process.

In some embodiments, after patterning the reflective film such that the plurality of openings are formed in the reflective film to form the reflective layer, the manufacturing method further includes:

arranging light-emitting devices in the openings; forming a barrier wall on the reflective layer, the barrier wall dividing the reflective layer into a plurality of sub-regions; and forming a plurality of encapsulation portions on a side of the circuit board away from the support layer, each encapsulation portion being located in a sub-region in the plurality of sub-regions, and a surface of the encapsulation portion away from the circuit board being substantially flush with a surface of the barrier wall away from the circuit board.

In some embodiments, in a process for forming the plurality of encapsulation portions on the side of the circuit board away from the support layer, an encapsulation sub-layer is further formed; the encapsulation sub-layer is disposed on a side of the plurality of encapsulation portions away from the circuit board, and the encapsulation sub-layer covers the plurality of encapsulation portions and the barrier wall.

In yet another aspect, a backlight module is provided. The backlight module includes the light-emitting substrate described in any one of the embodiments above and a plurality of optical films. The light-emitting substrate has a light exit side and a non-light exit side that are opposite, and the plurality of optical films are disposed on the light exit side of the light-emitting substrate.

In yet another aspect, a display apparatus is provided. The display apparatus includes the backlight module described in the embodiments above and a display panel. The display panel is disposed on a side, away from the light-emitting substrate, of the plurality of optical films of the backlight module.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings. In addition, the accompanying drawings to be described below may be regarded as schematic diagrams, and are not limitations on actual sizes of products, actual processes of methods and actual timings of signals involved in the embodiments of the present disclosure.

DETAILED DESCRIPTION

Figure 1:
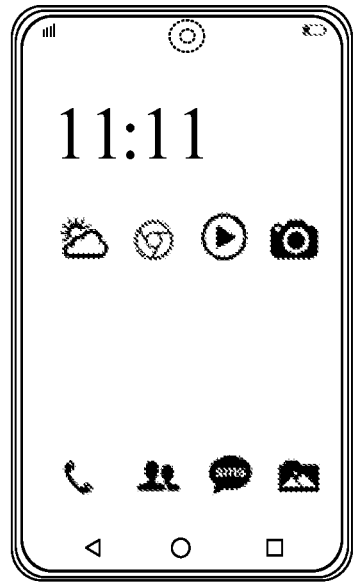
FIG. 1 is a structural diagram of a display apparatus, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, the terms "a plurality of", "the plurality of" and "multiple" each mean two or more unless otherwise specified.

In the description of some embodiments, the terms "coupled", "connected" and derivatives thereof may be used. For example, the term "connected" may be used in the description of some embodiments to indicate that two or more components are in direct physical or electrical contact with each other. As another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the context herein.

The phrase "at least one of A, B and C" has the same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, depending on the context, the term "if" is optionally construed as "when", "in a case where", "in response to determining" or "in response to detecting". Similarly, depending on the context, the phrase "if it is determined" or "if [a stated condition or event] is detected" is optionally construed as "in a case where it is determined", "in response to determining", "in a case where [the stated condition or event] is detected", or "in response to detecting [the stated condition or event]".

The phrase "applicable to" or "configured to" used herein means an open and inclusive expression, which does not exclude devices that are applicable to or configured to perform additional tasks or steps.

In addition, the phase "based on" used is meant to be open and inclusive, since a process, step, calculation or other action that is "based on" one or more of the stated conditions or values may, in practice, be based on additional conditions or value exceeding those stated.

As used herein, the term such as "parallel", "perpendicular" or "equal" includes a stated condition and a condition similar to the stated condition. A range of the similar condition is within an acceptable range of deviation, and the acceptable range of deviation is determined by a person of ordinary skill in the art in view of measurement in question and errors associated with measurement of a particular quantity (i.e., the limitation of the measurement system). For example, the term "parallel" includes absolute parallelism and approximate parallelism, and an acceptable range of deviation of the approximate parallelism may be, for example, a deviation within 5°. The term "perpendicular" includes absolute perpendicularity and approximate perpendicularity, and an acceptable range of deviation of the approximate perpendicularity may also be, for example, a deviation within 5°. The term "equal" includes absolute equality and approximate equality, and an acceptable range of deviation of approximate equality may be, for example, that a difference between two equals is less than or equal to 5% of any one of the two equals.

It will be understood that, in a case where a layer or component is referred to as being on another layer or a substrate, it may be that the layer or component is directly on the another layer or substrate; or it may be that intermediate layer(s) exist between the layer or component and the another layer or substrate.

Exemplary embodiments are described herein with reference to sectional views and/or plan views as idealized exemplary drawings. In the accompanying drawings, thicknesses of layers and sizes of regions are enlarged for clarity. Variations in shape relative to the accompanying drawings due to, for example, manufacturing technologies and/or tolerances may be envisaged. Therefore, the exemplary embodiments should not be construed as being limited to the shapes of the regions shown herein, but including shape deviations due to, for example, manufacturing. For example, an etched region shown to have a rectangular shape generally has a feature of being curved. Therefore, the regions shown in the accompanying drawings are schematic in nature, and their shapes are not intended to show actual shapes of regions in an apparatus, and are not intended to limit the scope of the exemplary embodiments.

As shown in FIG. 1, some embodiments of the present disclosure provide a display apparatus 1000, and the display apparatus 1000 may be any apparatus that displays an image whether in motion (e.g., a video) or stationary (e.g., a still image), and whether literal or graphical.

For example, the display apparatus 1000 may be any product or component having a display function, such as a television, a notebook computer, a tablet computer, a mobile phone, a personal digital assistant (PDA), a navigator, a wearable device, an augmented reality (AR) device, or a virtual reality (VR) device. The embodiments of the present disclosure do not limit to this.

In some embodiments, the display apparatus 1000 may be a liquid crystal display apparatus.

Figure 2A:
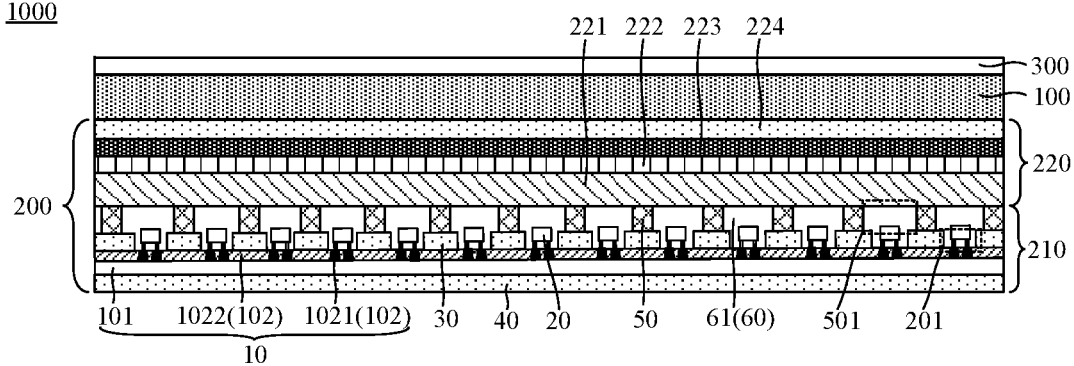
FIG. 2A is a sectional view of a display apparatus, in accordance with some embodiments.

As shown in FIG. 2A, the display apparatus 1000 may include a display panel 100, a backlight module 200 and a glass cover plate 300.

The display panel 100 includes a light exit side and a non-light exit side that are oppositely disposed. The light exit side refers to a side of the display panel 100 for displaying an image (an upper side of the display panel 100 in FIG. 2A), and the non-light exit side refers to another side opposite to the light exit side (a lower side of the display panel 100 in FIG. 2A).

The backlight module 200 is disposed on the non-light exit side of the display panel 100, and the backlight module 200 is used to provide a light source for the display panel 100.

The glass cover plate 300 is disposed on the light exit side of the display panel 100, and the glass cover plate 300 is used to protect the display panel 100. For example, the glass cover plate 300 may be made of a rigid material such as glass, quartz, plastic; or the glass cover plate 300 may be made of a flexible material such as polymer resin.

In some examples, with continued reference to FIG. 2A, the backlight module 200 may include a light-emitting substrate 210 and a plurality of optical films 220.

The light-emitting substrate 210 may directly emit white light, and the white light is directed to the display panel 100 after subjected to a light homogenization process. Alternatively, the light-emitting substrate 210 may emit light of other colors (e.g., blue light), and the light is directed to the display panel 100 after subjected to a color conversion process and the light homogenization process.

It will be noted that, the light-emitting substrate 210 has a light-emitting side and a non-light emitting side that are oppositely disposed. The light-emitting side refers to a side of the light-emitting substrate 210 that provides the light source (an upper side of the light-emitting substrate 210 in FIG. 2A), and the non-light emitting side refers to another side opposite to the light-emitting side (a lower side of the light-emitting substrate 210 in FIG. 2A).

The plurality of optical films 220 are disposed on the light-emitting side of the light-emitting substrate 210. For example, as shown in FIG. 2A, the plurality of optical films 220 are a diffuser plate 221, a quantum dot film 222, a diffuser sheet 223 and a composite film 224 that are disposed in sequence. The diffuser plate 221 can blur light emitted from the light-emitting substrate 210, and provide support for the quantum dot film 222, the diffuser sheet 223 and the composite film 224. The quantum dot film 222 can convert light emitted from the light-emitting substrate 210 into white light under excitation of light of a certain color, thereby improving a utilization rate of the light energy of the light-emitting substrate 210. The diffuser sheet 223 can homogenize light passing through the diffuser sheet 223. The composite film 224 can improve a light exit efficiency of the backlight module 200, so as to improve display brightness of the display apparatus 1000. For example, the composite film 224 includes a brightness enhancement film (BEF) and a dual brightness enhancement film (DBEF). The flux of light in a certain angle range is improved according to principles of total reflection, refraction and polarization, so that the brightness of the display apparatus 1000 is improved.

For example, the light-emitting substrate 210 emits blue light in a direction away from the light-emitting substrate 210. The quantum dot film 222 may include a red quantum dot material, a green quantum dot material, and a transparent material. When blue light emitted from the light-emitting substrate 210 passes through the red quantum dot material, the blue light is converted into red light; when the blue light passes through the green quantum dot material, the blue light is converted into green light; the blue light may directly pass through the transparent material. Thus, the blue light, the red light and the green light are mixed at a certain ratio into the white light. The diffuser plate 221 and the diffuser sheet 223 can homogenize the white light to ameliorate light shadow generated by the light-emitting substrate 210, thereby improving the display image quality of the display apparatus 1000.

However, in the related art, a light-emitting substrate includes a substrate and a plurality of film layers disposed on a side of the substrate. A tensile force applied to the side of the substrate is relatively large; especially for a reflective layer formed on the side of the substrate by a screen printing process, a tension force inside the reflective layer is relatively large, which has a relatively large tensile force on the side of the substrate. As a result, a risk of warping or breaking of the substrate is increased.

Figure 3:
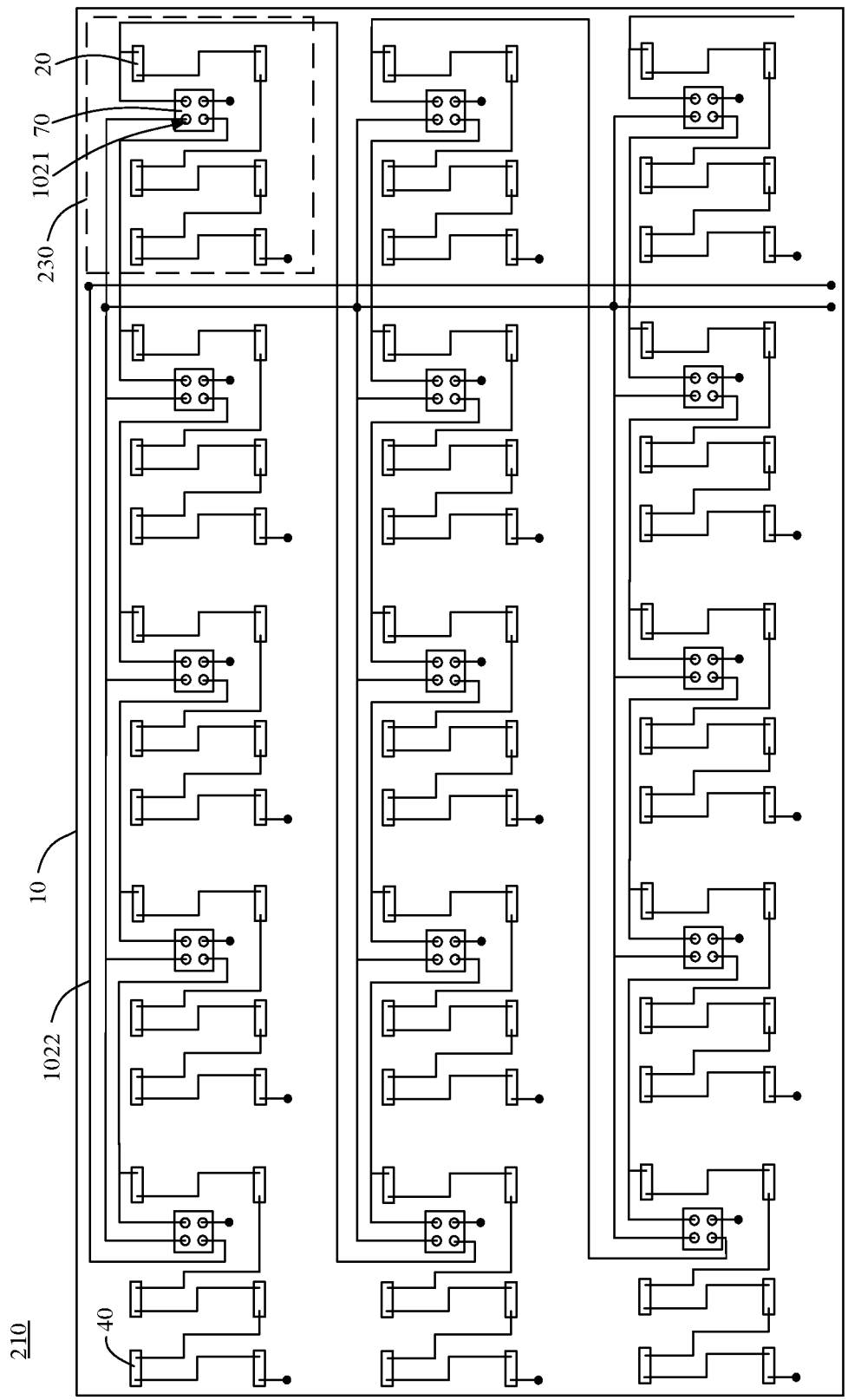
FIG. 3 is a top view of a light-emitting substrate, in accordance with some embodiments.
Figure 4:
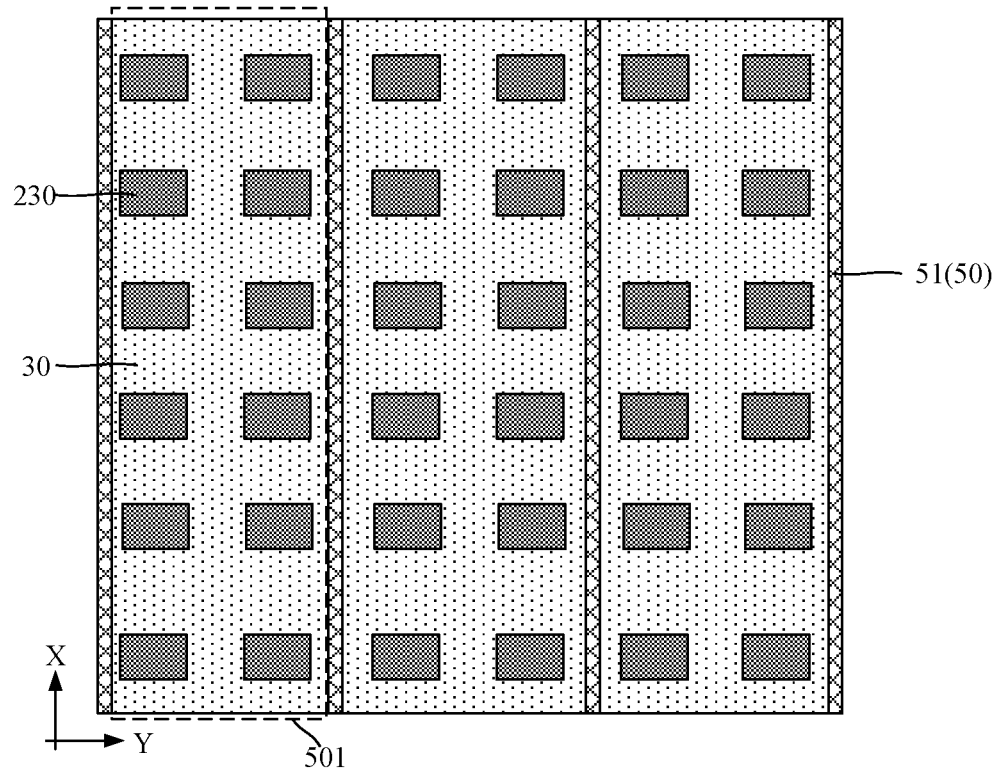
FIG. 4 is another top view of a light-emitting substrate, in accordance with some embodiments.

In order to solve the technical problems above, referring to FIGS. 2A, 3 and 4, some embodiments of the present disclosure provide the light-emitting substrate 210. The light-emitting substrate 210 includes a circuit board 10, a plurality of light-emitting devices 20, a reflective layer 30 and a support layer 40.

In some embodiments, as shown in FIG. 2A, the circuit board 10 includes a base 101.

In some examples, the base 101 may be any one of bases such as a glass base, a quartz base, a sapphire base and a ceramic base; or the base 101 may be any one of semiconductor bases such as a monocrystalline semiconductor base (being made of a material such as silicon or silicon carbide), a polycrystalline semiconductor base based on silicon or silicon carbide, a semiconductor base of a compound such as silicon germanium, and a silicon on insulator (SOI) base; or the base 101 may include a film layer made of one or more organic resin materials such as epoxy resin, triazine, silicone resin and polyimide.

Based on this, the circuit board 10 further includes at least one conductive layer 102 disposed on the base 101. The conductive layer 102 is made of one or more of copper, molybdenum niobium alloy (MoNb), nickel and indium tin oxide.

For example, referring to FIGS. 2A and 3, the conductive layer 102 may include pads 1021 and circuit traces 1022. The pad 1021 is configured to be connected to the light-emitting device 20 or a micro chip 70, and the circuit trace 1022 is configured to be connected to a different pad 1021 or transmit a signal.

In some other examples, the base 101 may be an FR4 printed circuit board (PCB), or may be a flexible PCB that is deformable. For example, the material of the base 101 may include one or more ceramic materials such as silicon nitride, AlN and $Al_2O_3$, or may include metal or metal compound. For example, the base 101 may be a metal core PCB or metal copper clad laminate (MCCL).

In some embodiments, the light-emitting device 20 may include one or more of a micro light-emitting diode (Micro LED) and a mini light-emitting diode (Mini LED).

It will be noted that a size (e.g., a length) of the Micro LED is less than 50 μm. For example, the size of the Micro LED is in a range of 10 ƒm to 50 μm, inclusive. A size (e.g., a length) of the Mini LED is in a range of 50 μm to 150 μm, inclusive. For example, the size of the Mini LED is in a range of 80 μm to 120 μm, inclusive. Different light-emitting devices may be selected in the embodiment of the present disclosure according to actual requirements. The plurality of light-emitting devices 20 are disposed on the circuit board 10.

In some embodiments, as shown in FIG. 2A, the reflective layer 30 is disposed on the circuit board 10, and the reflective layer 30 is configured to reflect light that is emitted from the light-emitting device 20 and directed to the circuit board 10, so that more light emitted from the light-emitting device 20 is directed to the display panel 100. As a result, the light exit efficiency of the light-emitting substrate 210 is improved and thus the display effect is improved.

The reflective layer 30 is provided with a plurality of openings 201 therein, and at least two pads 1021 are disposed in an opening 201. The pad 1021 is used to be electrically connected to a pin of the light-emitting device 20 or a pin of the micro chip 70.

For example, in a case where two pads 1021 are disposed in the opening 201, one light-emitting device 20 corresponds to the opening 201, and two pins of the one light-emitting device 20 are electrically connected to the two pads 1021, respectively. In a case where a plurality of pads 1021 are disposed in the opening 201, one micro chip 70 corresponds to the opening 201, and a plurality of pins of the one micro chip 70 are in one-to-one correspondence with and electrically connected to the plurality of pads 1021.

It will be noted that, a shape of an orthographic projection of the opening 201 on the circuit board 10 may be a circle, a polygon, etc., which is not specifically limited in the embodiments of the present disclosure.

In some embodiments, the support layer 40 is disposed on a side of the circuit board 10 away from the reflective layer 30. The support layer 40 and the reflective layer 30 are disposed on two opposite sides of the circuit board 10, respectively. A tensile force applied to the circuit board 10 by the reflective layer 30 and a tensile force applied to the circuit board 10 by the support layer 40 may at least partially cancel each other out, thereby reducing the risk of warping or breaking of the circuit board 10.

In addition, the support layer 40 and the reflective layer 30 may be synchronously formed on the two opposite sides of the circuit board 10, respectively, so as to reduce the risk that the circuit board 10 is warped or broken due to a single side of the circuit board subjected to the pressure in the manufacturing process.

It will be noted that, fabricating processes of the support layer 40 and the reflective layer 30 may be referred to the following, and details will not be described here.

A material of the support layer 40 and a material of the reflective layer 30 may the same; and/or a thickness of the support layer 40 and a thickness of the reflective layer 30 may be substantially the same. In this way, it is possible to help reduce the complexity and difficulty of the fabricating processes, and improve the fabricating efficiency.

For example, the material of the support layer 40 and the material of the reflective layer 30 may be materials of the same kind. In this way, the support layer 40 and the reflective layer 30 may be fabricated by a same process, thereby reducing the process complexity. For example, the reflective layer 30 and the support layer 40 are each made of an insulating material. For example, the material of the reflective layer 30 is any one of a photosensitive white ink, a curable white ink, or the like; the material of the support layer 40 is a photosensitive white ink, a curable white ink, plastic, a glass fiber composite material, a carbon fiber composite material, or the like. Of course, the material of the support layer 40 and the material of the reflective layer 30 may be materials of different kinds. For example, the material of the support layer 40 is silver, stainless steel, titanium alloy, or the like, as long as tensile forces applied to the circuit board 10 by the support layer 40 and the reflective layer 30 at least partially cancel each other out.

For example, the thickness of the reflective layer 30 is in a range of 40 µm to 60 µm, inclusive, so that a reflectivity of the reflective layer 30 is ensured to be relatively high. As a result, the light exit efficiency of the light-emitting substrate 210 is improved. For example, the thickness of the reflective layer 30 is 40 µm, 50 µm or 60 µm. For example, the thickness of the reflective layer 30 is 40 µm.

For example, a thickness tolerance of the reflective layer 30 is in a range of −2 µm to 2 µm (i.e., ±2 µm), inclusive, so that the reflective layer 30 has a higher thickness uniformity. As a result, it helps improve the luminance uniformity and chroma uniformity of the display apparatus 1000.

In this way, the thickness of the support layer 40 is in a range of 40 µm to 60 µm, inclusive. For example, the thickness of the support layer 40 is 40 µm, 50 µm, or 60 µm. For example, the thickness of the support layer 40 is 40 µm. A thickness tolerance of the support layer 40 is in a range of −2 µm to 2 µm (i.e., ±2 µm), inclusive. In this way, the support layer 40 and the reflective layer 30 may be set to have the same thickness, which is convenient to fabricate the support layer 40 and the reflective layer 30 by using the same process, thereby helping reduce the process cost. In addition, the tensile force applied to the circuit board 10 by the reflective layer 30 and the tensile force applied to the circuit board 10 by the support layer 40 may cancel each other out, thereby reducing the risk of warping or breaking of the circuit board 10.

In addition, referring to FIG. 3, the light-emitting substrate 210 includes a plurality of light-emitting regions 230 arranged in an array, and the light-emitting region 230 is provided therein with light-emitting devices 20 connected in series and/or in parallel.

For example, as shown in FIG. 3, each light-emitting region 230 is provided therein with six light-emitting devices 20 that are connected in series. Of course, each light-emitting region 230 may also include two, three, four, or eight light-emitting devices 20; a connection manner between the light-emitting devices 20 in the light-emitting region 230 is not limited to a manner of being connected in series, but may also be a manner of being connected in parallel, or a manner of being connected in a combination of series and parallel. The embodiments of the present disclosure are not limited to this.

As shown in FIG. 3, the following description is made by considering an example in which each light-emitting region 230 is provided therein with six light-emitting devices 20 connected in series.

For example, the light-emitting substrate 210 may further include micro chips 70. The micro chip 70 is fixed on the circuit board 10, and is electrically connected to the circuit board 10 through pads 1021; the micro chip 70 is fixed in the opening 201.

It will be noted that, the micro chip 70 includes a sensor chip and a driver chip. For example, the sensor chip may be a photosensitive sensor chip or a thermal sensor chip. The driver chip is used to provide a driving signal to the light-emitting device 20. For example, FIG. 3 is illustrated by considering the driver chip of the micro chip 70 as an example. The driver chip is electrically connected to the circuit board 10 through four pads 1021.

Figure 2B:
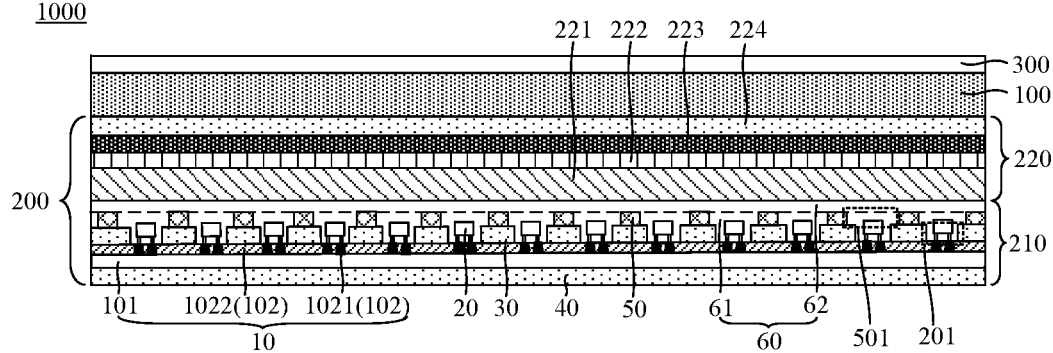
FIG. 2B is another sectional view of a display apparatus, in accordance with some embodiments.

In some embodiments, as shown in FIGS. 2A and 2B, the light-emitting substrate 210 further includes a barrier wall 50 and an encapsulation layer 60.

In some examples, as shown in FIGS. 2A and 2B, the barrier wall 50 is disposed on a surface of the reflective layer 30 away from the circuit board 10, and an orthographic projection of the barrier wall 50 on the circuit board 10 is located within an orthographic projection of the reflective layer 30 on the circuit board 10. As shown in FIGS. 4 to 7, the barrier wall 50 defines a plurality of sub-regions 501.

Figure 5:
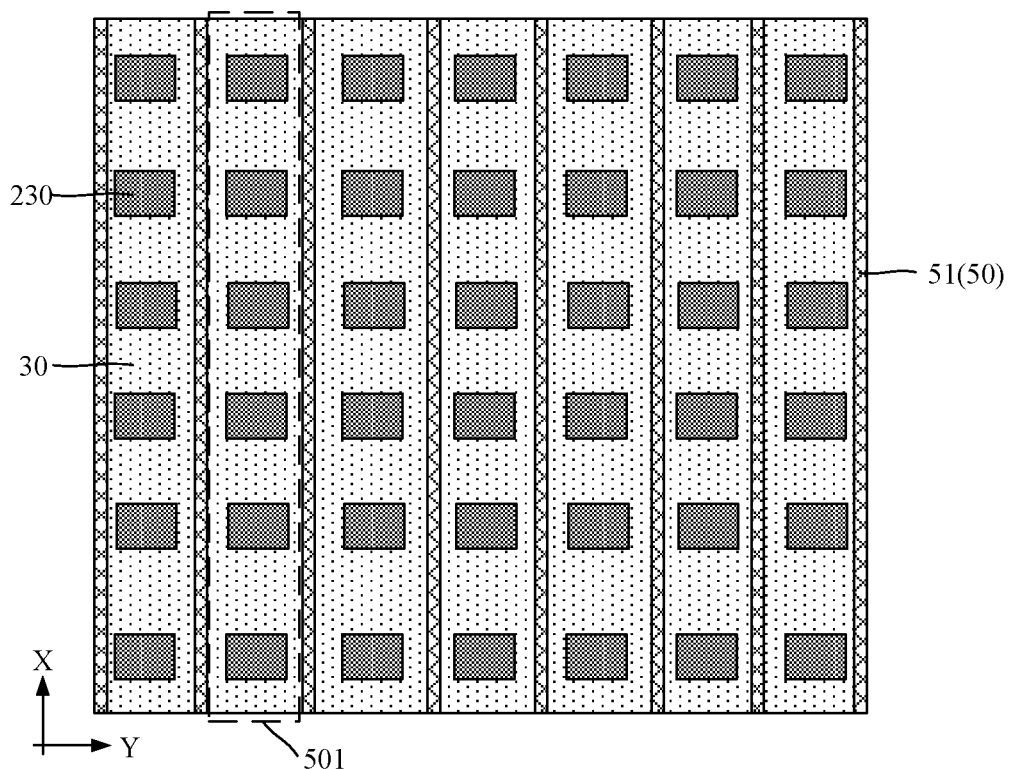
FIG. 5 is yet another top view of a light-emitting substrate, in accordance with some embodiments.

In some examples, as shown in FIGS. 4 and 5, the barrier wall 50 includes a plurality of first sub-portions 51 that extend along the first direction X and are arranged at intervals along the second direction Y. The first direction X and the second direction Y intersect.

An orthographic projection of each first sub-portion 51 on the circuit board 10 is in a shape of a long strip, and the plurality of first sub-portion 51 are arranged side by side. Here, a first sub-portion 51 may be arranged between every two adjacent rows of light-emitting regions 230 or every two columns of light-emitting regions 230; or the first sub-portion 51 may be provided between every two adjacent rows light-emitting devices 20 or every two columns of light-emitting devices 20. It will be understood that, the terms "row" and "column" are described according to the examples in the figures, and do not limit the extending direction and the arrangement direction of the first sub-portions 51. The following embodiments are described by considering an example in which light-emitting regions 230 arranged in a direction parallel to the first direction X serve as a column of light-emitting regions 230, and light-emitting regions 230 arranged in a direction perpendicular to the first direction X (substantially parallel to the second direction Y) serve as a row of light-emitting regions 230.

For example, as shown in FIG. 4, the plurality of light-emitting regions 230 are arranged in a plurality of rows and a plurality of columns; each row of light-emitting regions 230 includes multiple light-emitting regions 230 that are arranged substantially along the second direction Y, and each column of light-emitting regions 230 includes multiple light-emitting regions 230 that are arranged substantially along the first direction X. The first direction X is substantially perpendicular to the second direction Y. In this case, the first sub-portion 51 may extend substantially along the first direction X. Any two adjacent first sub-portions 51 are separated by two columns of light-emitting regions 230.

As another example, as shown in FIG. 5, the plurality of light-emitting regions 230 are arranged in a plurality of rows and a plurality of columns; each row of light-emitting regions 230 includes multiple light-emitting regions 230 that are arranged substantially along the second direction Y, and each column of light-emitting regions 230 includes multiple light-emitting regions 230 that are arranged substantially along the first direction X. The first direction X is substantially perpendicular to the second direction Y. In this case, the first sub-portion 51 may extend substantially along the first direction X. Each first sub-portion 51 is located between two adjacent columns of light-emitting regions 230.

Figure 6:
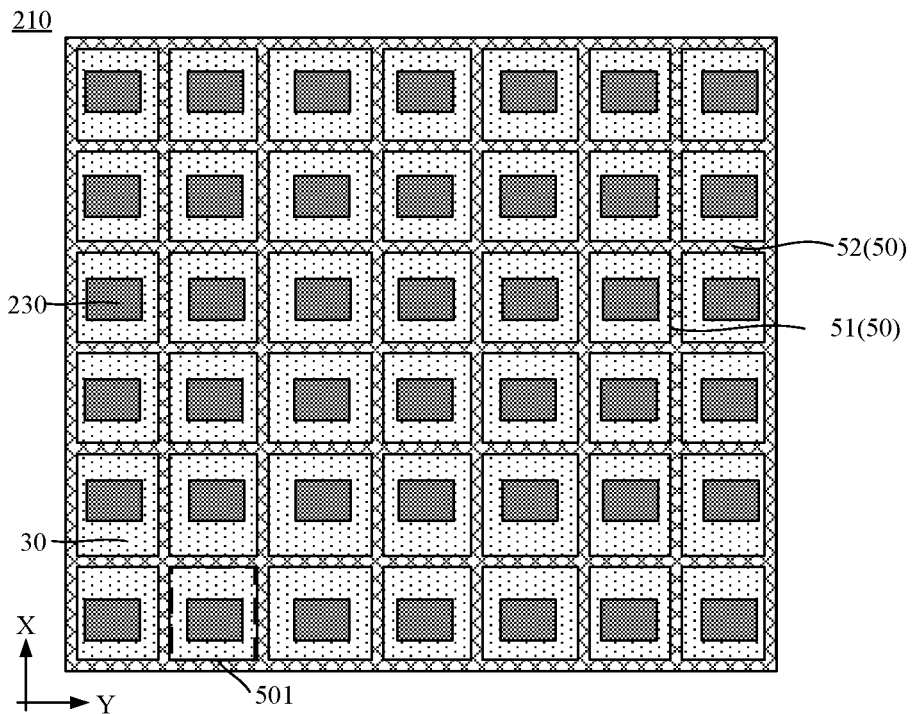
FIG. 6 is yet another top view of a light-emitting substrate, in accordance with some embodiments.
Figure 7:
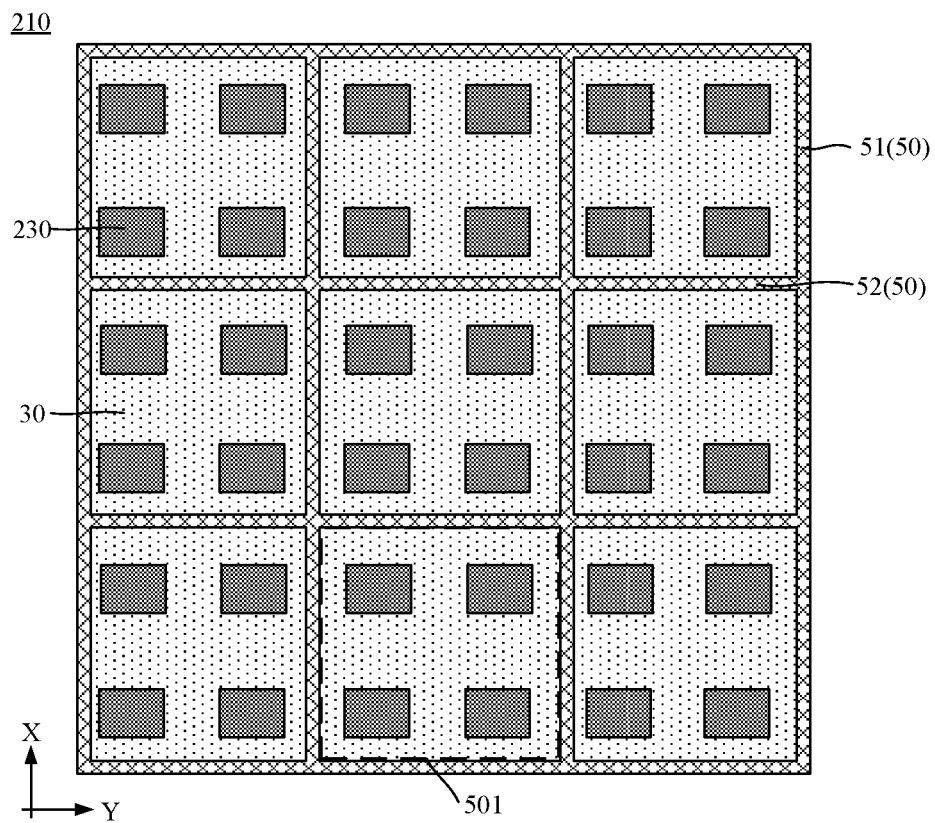
FIG. 7 is yet another top view of a light-emitting substrate, in accordance with some embodiments.

In some other embodiments, as shown in FIGS. 6 and 7, the barrier wall 50 includes the plurality of first sub-portions 51 that extend along the first direction X and are arranged at intervals along the second direction Y, and a plurality of second sub-portions 52 that extend along the second direction Y and are arranged at intervals along the first direction X. That is, an orthographic projection of the barrier wall 50 on the circuit board 10 is in a shape of a grid. Here, each cell in the grid of the grid-shaped barrier wall 50 may be provided with only one light-emitting device 20 therein, or may be provided with light-emitting devices 20 therein.

For example, as shown in FIG. 6, the plurality of light-emitting regions 230 are arranged in a plurality of rows and a plurality of columns; each row of light-emitting regions 230 includes multiple light-emitting regions 230 that are arranged substantially along the second direction Y, and each column of light-emitting regions 230 includes multiple light-emitting regions 230 that are arranged substantially along the first direction X. The first direction X is substantially perpendicular to the second direction Y.

In this case, the barrier wall 50 includes the plurality of first sub-portions 51 extending substantially along the first direction X and the plurality of second sub-portions 52 extending substantially along the second direction Y. Each first sub-portion 51 is located between two adjacent columns of light-emitting regions 230, and each second sub-portion 52 is located between two adjacent rows of light-emitting regions 230. For example, six light-emitting devices 20 are disposed in each light-emitting region 230, and each cell in the grid corresponds to a light-emitting region 230. Thus, six light-emitting devices 20 are disposed in each cell in the grid.

As another example, as shown in FIG. 7, the plurality of light-emitting regions 230 are arranged in a plurality of rows and a plurality of columns; each row of light-emitting regions 230 includes multiple light-emitting regions 230 that are arranged substantially along the second direction Y, and each column of light-emitting regions 230 includes multiple light-emitting regions 230 that are arranged substantially along the first direction X. The first direction X is substantially perpendicular to the second direction Y.

In this case, the barrier wall 50 includes the plurality of first sub-portions 51 extending substantially along the first direction X and the plurality of second sub-portions 52 extending substantially along the second direction Y. Any two adjacent first sub-portions 51 are separated by two columns of light-emitting regions 230, and any two adjacent second sub-portions 52 are separated by two rows of light-emitting regions 230. For example, one light-emitting device 20 is disposed in each light-emitting region 230, and each cell in the grid corresponds to four light-emitting regions 230. Thus, four light-emitting devices 20 are disposed in each cell in the grid.

A reflectivity of the barrier wall 50 may be greater than or equal to 85%. For example, the reflectivity of the barrier wall 50 may be 85%, 90%, or 93%. A material of the barrier wall 50 may include white high molecular polymer. For example, the material of the barrier wall 50 may include white adhesive and/or plastic. For example, the material of the barrier wall 50 includes one or more of white polycarbonate, resin (e.g., epoxy resin or polytetrafluoroethylene resin), titanium dioxide ($TiO_2$), and organic solvent (e.g., dipropylene glycol methyl ether).

With such arrangement, light emitted from the light-emitting device 20 is reflected by the barrier wall 50, so that the light can only exit from a sub-region where the light-emitting device 20 is located, and cannot leak from adjacent sub-regions. In this way, it is possible to improve the contrast of luminance of sub-regions, thereby improving the contrast of the display apparatus 1000. As a result, the display effect of the display apparatus 1000 is improved.

In some embodiments, as shown in FIGS. 2A and 2B, the encapsulation layer 60 is disposed on a side of the circuit board 10 away from the support layer 40, and covers at least the plurality of light-emitting devices 20.

In some examples, as shown in FIG. 2A, the encapsulation layer 60 includes a plurality of encapsulation portions 61 arranged at intervals. Each encapsulation portion 61 is located in a sub-region 501, and a surface of the encapsulation portion 61 away from the circuit board 10 is substantially flush with a surface of the barrier wall 50 away from the circuit board 10.

In this case, the encapsulation layer 60 is divided by the barrier wall 50 into the plurality of encapsulation portions 61 arranged at intervals, and the plurality of encapsulation portions 61 can disperse the tensile force applied to the circuit board 10 into the plurality of sub-regions 501. As a result, the risk of warping or breaking of circuit board 10 is further reduced.

In some other examples, as shown in FIG. 2B, the encapsulation layer 60 includes the plurality of encapsulation portions 61 and an encapsulation sub-layer 62. Each encapsulation portion 61 is located in a sub-region; the encapsulation sub-layer 62 is disposed on a side of the plurality of encapsulation portions 61 away from the circuit board 10, and the encapsulation sub-layer 62 covers the plurality of encapsulation portions 61 and the barrier wall 50.

In this case, a portion of the encapsulation layer 60 proximate to the circuit board 10 is divided by the barrier wall 50 into the plurality of encapsulation portions 61 arranged at intervals, and the tensile force applied to the circuit board 10 is dispersed by the encapsulation layer 60 into the plurality of sub-regions 501. As a result, the risk of warping or breaking of circuit board 10 is further reduced.

Figure 8:
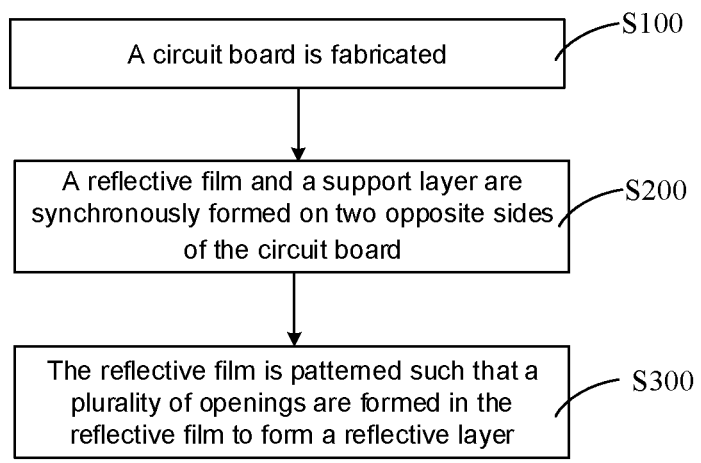
FIG. 8 is a flowchart of a method for manufacturing a light-emitting substrate, in accordance with some embodiments.

Some of the embodiments of the present disclosure provide a method for manufacturing a light-emitting substrate 210, as shown in FIG. 8, the method includes S100 to S300.

In S100, a circuit board 10 is fabricated.

In the step, the circuit board 10 may include a base 101, and circuit traces 1022 and pads 1021 that are disposed on the base 101.

The process for fabricating the circuit board 10 is not unique. For example, a conductive film is formed on the base 101 by coating or chemical deposition, and the conductive film is exposed, developed and etched, so that the circuit traces 1022 and the pads 1021 are formed.

In S200, a reflective film and a support layer 40 are synchronously formed on two opposite sides of the circuit board 10, respectively.

In the step, referring to FIG. 2A, the reflective film is used to form the reflective layer 30 mentioned above. That is, the reflective film covers the circuit traces 1022 and the pads 1021 of the circuit board 10.

In this case, the reflective film and the support layer 40 are synchronously formed on two opposite sides of the circuit board 10, respectively, which may reduce the risk that the circuit board 10 is warped or broken due to the pressure in the manufacturing process.

Figure 9:
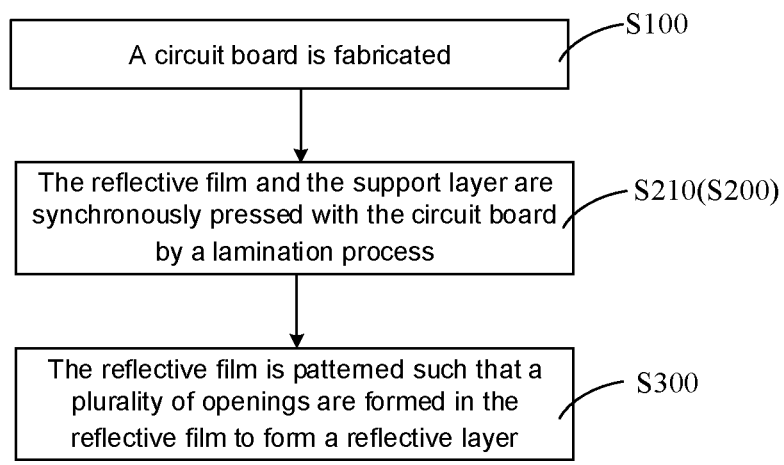
FIG. 9 is a flowchart of another method for manufacturing a light-emitting substrate, in accordance with some embodiments.
Figure 10:
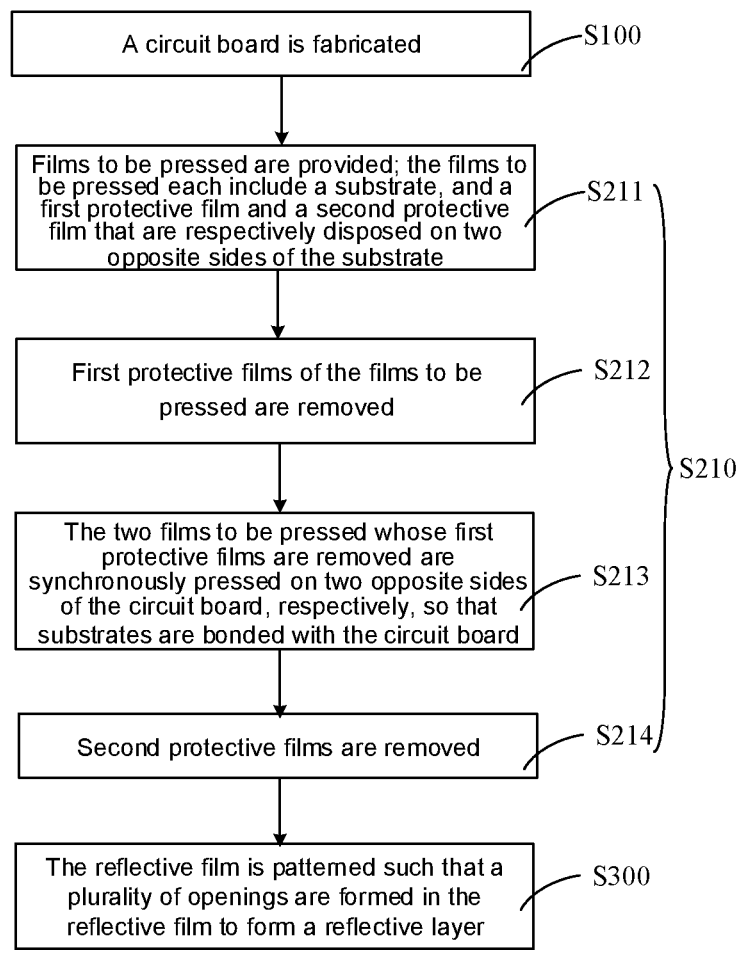
FIG. 10 is another flowchart of a method for manufacturing a light-emitting substrate, in accordance with some embodiments.

The process for forming the reflective film and the support layer 40 on the circuit board 10 is not unique. For example, referring to FIG. 9, S200 includes S210.

In S210, the reflective film and the support layer 40 are synchronously pressed with the circuit board 10 by a lamination process.

It will be understood that, compared with a screen printing process, by using the lamination process to press the support layer 40 and an entire layer of the reflective film with the circuit board 10, it may be possible to prevent a screen used in the screen printing process from causing damage to the circuit traces 1022 or the pads 1021, thereby improving the yield.

As shown in FIGS. 10 to 13, S210 includes S211 to S214.

Figure 11:
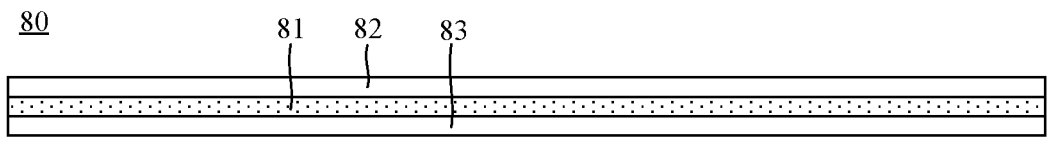
FIG. 11 is a structural diagram of a film to be pressed, in accordance with some embodiments.
Figure 12:
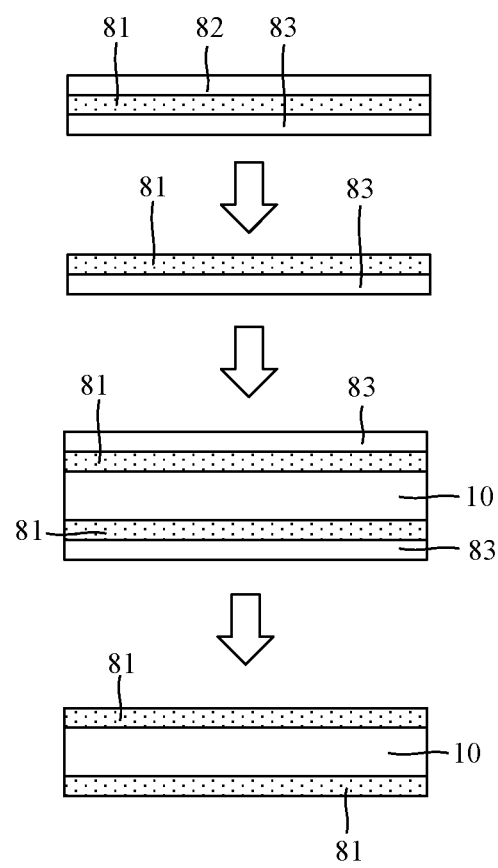
FIG. 12 is a diagram illustrating steps for fabricating a film to be pressed, in accordance with some embodiments.

In S211, as shown in FIG. 11, films to be pressed 80 are provided. The films to be pressed 80 each include a substrate 81, and a first protective film 82 and a second protective film 83 that are disposed on two opposite sides of the substrate 81, respectively.

It will be noted that substrates 81 are used to form the reflective film and the support layer 40. That is, a material of the substrate 81 is, for example, photosensitive white ink.

The first protective film 82 and the second protective film 83 are used to protect the substrate 81, and materials of the first protective film 82 and the second protective film 83 may be the same to reduce the variety of the materials.

For example, the materials of the first protective film 82 and the second protective film 83 each include plastic. For example, the materials of the first protective film 82 and the second protective film 83 each are polyethylene terephthalate (PET).

In S212, first protective films 82 of the films to be pressed 80 are removed.

In the step, the first protective film 82 may be manually peeled off, or may be peeled off by a mechanical equipment through a roller.

In S213, the two films to be pressed 80 whose first protective films 82 are removed are synchronously pressed on two opposite sides of the circuit board 10, respectively, so that the substrates 81 are bonded with the circuit board 10.

In the step, the two films to be pressed 80 whose first protective films 82 are removed may be synchronously pressed with the circuit board 10 by using a vacuum pressing process.

Figure 13:
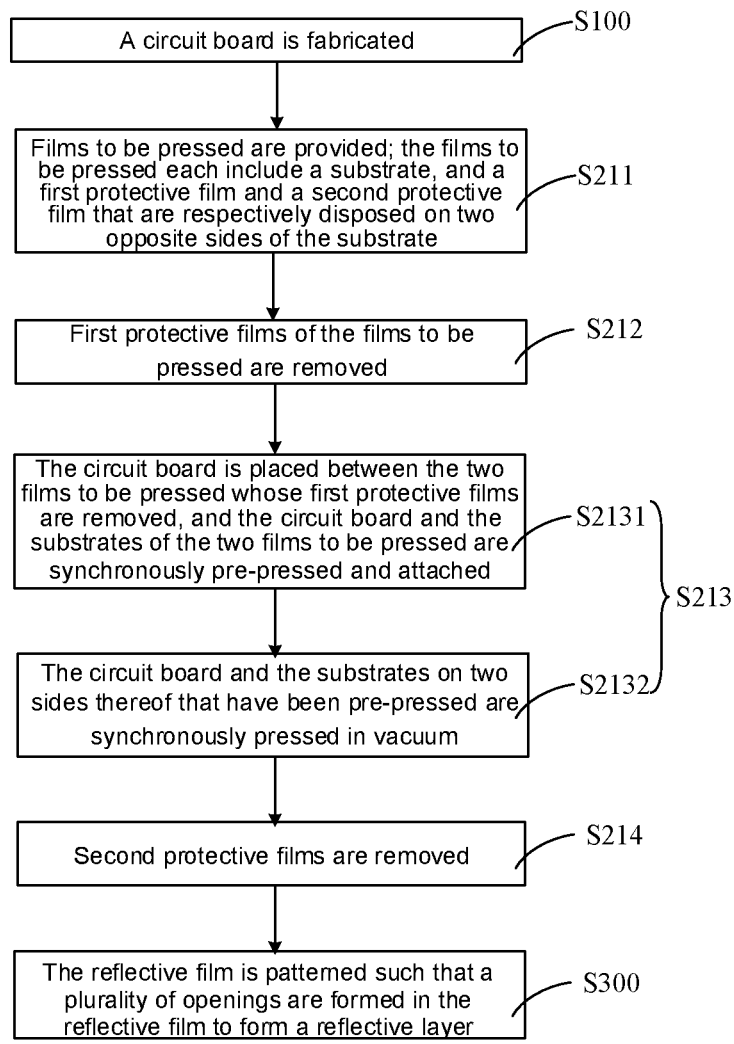
FIG. 13 is a yet another flowchart of a method for manufacturing a light-emitting substrate, in accordance with some embodiments.

For example, as shown in FIG. 13, S213 includes S2131 to S2132.

In S2131, the circuit board 10 is placed between the two films to be pressed 80 whose first protective films 82 are removed, and the circuit board 10 and the substrates 81 of the two films to be pressed 80 are synchronously pre-pressed and attached.

In the step, the circuit board 10 and the substrates 81 of the two films to be pressed 80 whose first protective films 82 are removed may be pre-pressed in a manual pressing manner or by a film pressing device, so that the circuit board 10 and the substrates 81 of the two films to be pressed 80 are aligned, pre-pressed and attached.

In S2132, the circuit board 10 and the substrates 81 on two sides thereof that have been pre-pressed and attached are synchronously pressed and attached in vacuum.

In the step, the circuit board 10 and the substrates 81 on two sides thereof that have been pre-pressed and attached may be placed in a vacuum film pressing device, and be pressed for 20 s to 40 s under a vacuum condition of less than 2 hPa and a temperature condition of 50° C. to 60° C.

In S214, second protective films 83 are removed.

In the step, the second protective film 83 may be manually peeled off, or may be peeled off by the mechanical equipment through a roller.

In this case, in the two substrates 81 bonded with the circuit board 10, one substrate 81 forms the reflective film mentioned above, and the other substrate 81 forms the support layer 40 mentioned above.

In S300, the reflective film is patterned such that a plurality of openings 201 are formed in the reflective film.

In the step, in a case where the material of the substrate 81 is the photosensitive white ink, the reflective film may be exposed with a mask, developed, and etched, so that the plurality of openings 201 are formed. In this case, the reflective film is patterned to form the reflective layer 30 mentioned above. Each opening 201 exposes at least two pads 1021.

Figure 14:
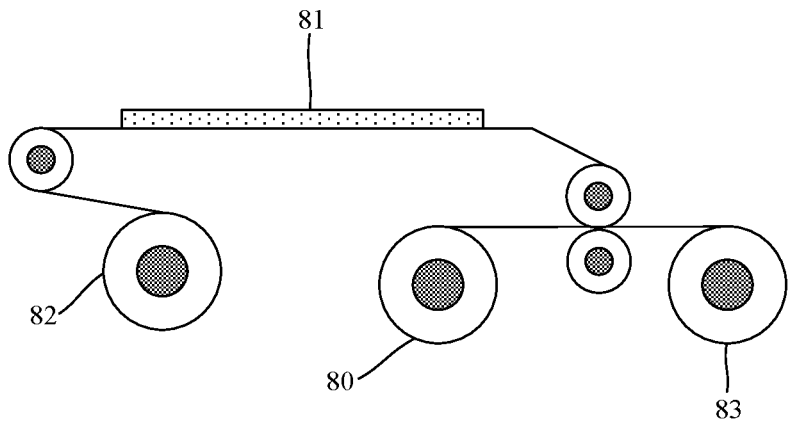
FIG. 14 is a schematic diagram of a process for fabricating a film to be pressed, in accordance with some embodiments.
Figure 15:
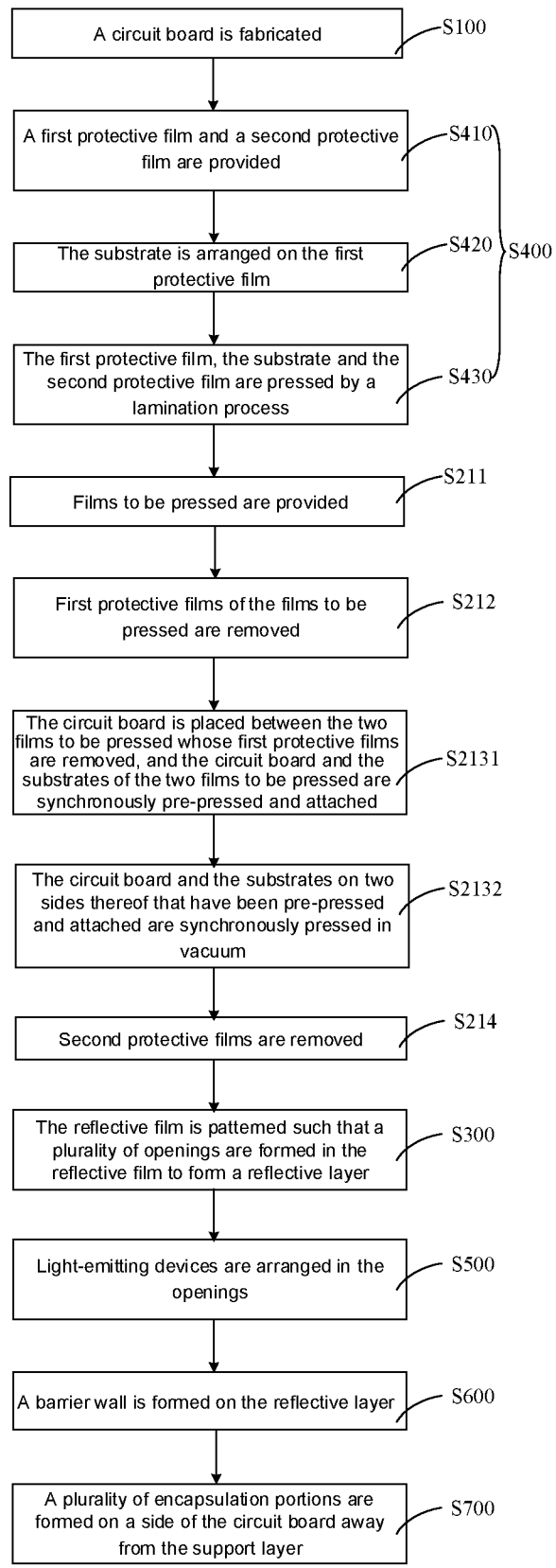
FIG. 15 is yet another flowchart of a method for manufacturing a light-emitting substrate, in accordance with some embodiments.

In some embodiments, as shown in FIGS. 14 and 15, before S211, the manufacturing method further includes S400, and in S400, the films to be pressed 80 is fabricated. The process for fabricating the film to be pressed 80 is not unique. For example, S400 includes S410 to S430.

In S410, the first protective film 82 and the second protective film 83 are provided.

In the step, the first protective film 82 may be a coiled material made of a successive plurality of protective films. That is, the plurality of protective films may be formed by cutting the continuous coiled material. The second protective film 83 may be a coiled material made of a successive plurality of protective films. That is, the plurality of protective films may be formed by cutting the coiled material.

It will be noted that, for the materials of the first protective film 82 and the second protective film 83, reference may be made to the description above, and details will not be described here.

In S420, the substrate 81 is arranged on the first protective film 82.

In the step, the substrate 81 may be formed on the first protective film 82 by a coating and drying process.

In S430, the first protective film 82, the substrate 81 and the second protective film 83 are pressed by a lamination process.

In the step, the first protective film 82 on which the substrate 81 is formed may be transported on a first conveyor belt, and the second protective film 83 may be transported on a second conveyor belt. In addition, in the lamination process, the first conveyor belt and the second conveyor belt are located between two rollers, and the first protective film 82, the substrate 81 and the second protective film 83 are pressed to be bonded by the two rollers.

In this case, it may be possible to accurately control the thickness of the substrate 81 in the lamination process. That is, the thickness of the reflective layer 30 may be accurately controlled, and the thickness tolerance of the reflective layer 30 may be reduced. For example, the thickness tolerance of the reflective layer 30 is controlled within −2 μm to 2 μm (i.e., ±2 μm), inclusive, thereby improving the luminance uniformity, reducing the chromatic aberration, and improving the display effect.

It will be understood that, the screen printing process is limited by a thickness, and a film layer with a maximum thickness of 30 μm is formed in one printing. Therefore, in a case where a substrate 81 with a thickness of 40 μm to 60 μm is fabricated by the screen printing process, the substrate 81 needs to be printed twice, and the process includes two printing processes; and if the substrate 81 is a curable white ink, two pre-curing processes are further required, resulting in the overall process flow being complicated.

Here, the lamination process is not limited by the thickness, and a substrate 81 with any thickness within 20 μm to 60 μm may be directly obtained according to the parameter adjustment of lamination. Compared with the screen printing process, by using the lamination process, it may be possible to reduce the number of processes, and simplify the process flow. For example, the lamination process may reduce two printing processes and one pre-curing process.

In some embodiments, as shown in FIG. 15, after S300, the manufacturing method further includes S500 to S700.

In S500, light-emitting devices 20 are arranged in the openings 201.

In the step, two pins of the light-emitting device 20 and two pads 1021 in an opening 201 corresponding to the light-emitting device 20 may be soldered respectively, so that the light-emitting device 20 is fixed on the circuit board 10.

In S600, a barrier wall 50 is formed on the reflective layer 30.

In the step, the barrier wall 50 may divide the circuit board 10 into a plurality of sub-regions 501. Here, the barrier wall 50 may be formed by printing or gluing.

For example, the orthographic projection of the barrier wall 50 on the circuit board 10 is in the shape of the grid, and the barrier wall 50 includes the plurality of first sub-portions 51 extending substantially along the first direction X, and the plurality of second sub-portions 52 extending substantially along the second direction Y.

In this case, a glue valve may be used to move along the first direction X with glue outflow to form the first sub-portion 51 extending along the first direction X; and then, the glue valve is used to move along the second direction Y with glue outflow to form the second sub-portion 52 extending along the second direction Y. As a result, the grid-shaped barrier wall 50 is formed.

In S700, a plurality of encapsulation portions 61 are formed on a side of the circuit board 10 away from the support layer 40.

In the step, each encapsulation portion 61 is located in a sub-region 501, and a surface of the encapsulation portion 61 away from the circuit board 10 is substantially flush with a surface of the barrier wall 50 away from the circuit board 10. Here, the encapsulation portions 61 may also be formed by printing or gluing.

In some embodiments, in the process of S700, an encapsulation sub-layer 62 is further formed. That is, the encapsulation portions 61 and the encapsulation sub-layer 62 may be synchronously formed by printing or gluing. The encapsulation sub-layer 62 is disposed on a side of the plurality of encapsulation portions 61 away from the circuit board 10, and the encapsulation sub-layer 62 covers the plurality of encapsulation portions 61 and the barrier wall 50.

Figure 16:
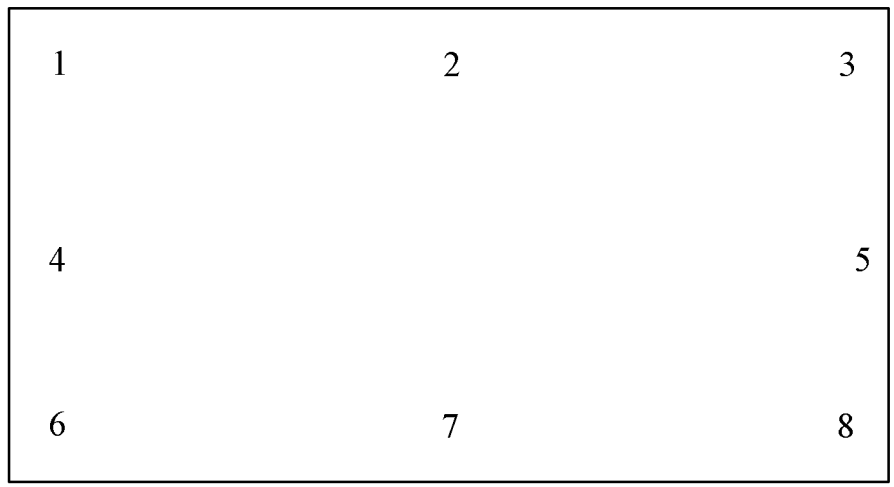
FIG. 16 is a diagram showing test points of a light-emitting substrate, in accordance with some embodiments.
Figure 17:
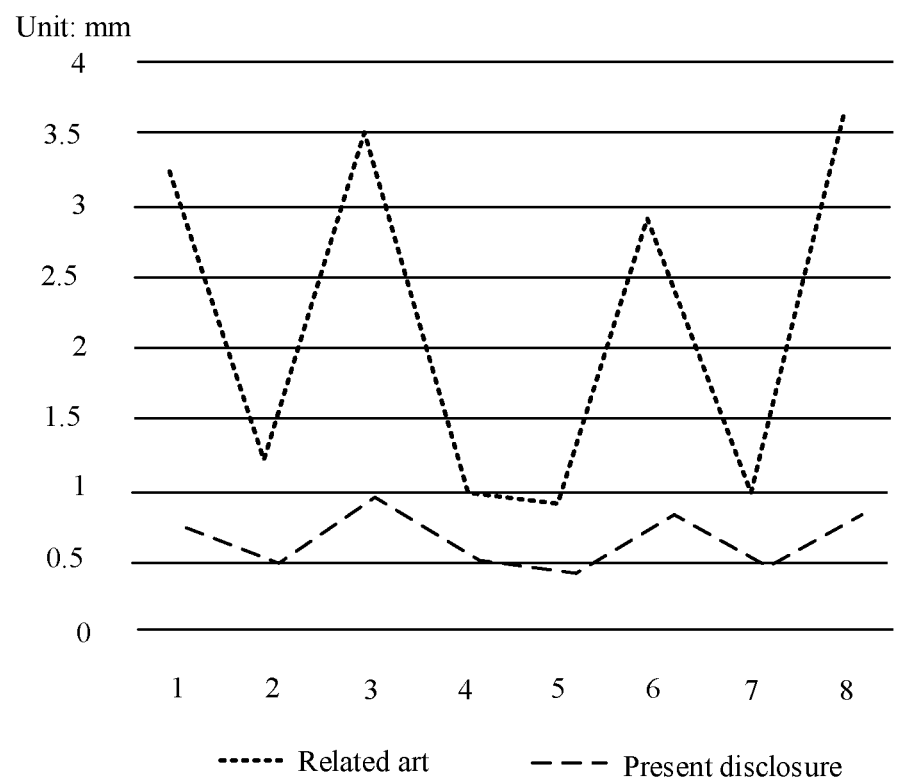
FIG. 17 is a diagram showing simulation test results of the warpage degrees of the test points (as shown in FIG. 16) of light-emitting substrates in the related art and in some embodiments of the present disclosure.

In order to objectively evaluate the technical effects of the embodiments of the present disclosure, the light-emitting substrate 210 provided in the embodiments above is subjected to a warpage test, and a test result is shown in FIGS. 16 and 17. For example, FIG. 16 is a schematic diagram showing positions of test points of the light-emitting substrate 210; FIG. 17 is a diagram showing a test result of comparison between a warpage degree of the light-emitting substrate 210 according to the embodiments and the light-emitting substrate in the related art, the horizontal coordinate of the broken line graph in FIG. 17 represents the test points, and the vertical coordinate represents warpage deformation. The light-emitting substrate 210 in the embodiments of the present disclosure in FIG. 17 is of a structure in which the reflective layer 30 and the support layer 40 are located on two opposite sides of the circuit board 10, respectively. The light-emitting substrate in the related art in FIG. 17 is a structure in which at least one film layer is provided on a single side of the circuit board.

It can be seen from FIGS. 16 and 17 that, compared with the related art, warpage degrees of eight test points of the light-emitting substrate 210 in the embodiments of the present disclosure each are reduced, and the warpage degrees of the eight test points each are less than 1 mm. Moreover, the difference between the warpage deformation of the eight test points is small. That is, the surface flatness of the light-emitting substrate is relatively high, which helps improve the luminance and uniformity of the light that is emitted from the light-emitting substrate 210 and directed to the display panel 100, thereby helping improve the luminance uniformity and the chroma uniformity of the display apparatus 1000.

In order to objectively evaluate the technical effects of the embodiments of the present disclosure, the display apparatus 1000 provided in the embodiments above is tested for luminance uniformity and chroma uniformity, and test results are shown in Table 1.

In Table 1:

| Attributes | Related art | Present disclosure |
|---|---|---|
| Luminance uniformity | 85% | 95% |
| Chroma uniformity (ΔE) | 0.6 to 1.0 | 0.2 to 0.4 |

It can be seen from the contents in Table 1 that, compared with the related art, as for the display apparatus in the embodiments of the present disclosure, the luminance uniformity is increased by 10%, and the chroma uniformity (ΔE) is reduced by about half. Thus, the display apparatus provided in the embodiments of the present disclosure has a better performance.

The foregoing descriptions are merely specific implementations of the present disclosure, but the protection scope of the present disclosure is not limited thereto. Any changes or replacements that a person skilled in the art could readily conceive of within the technical scope of the present disclosure shall be included in the protection scope of the present disclosure. Therefore, the protection scope of the present disclosure shall be subject to the protection scope of the claims.

What is claimed is:

1. A light-emitting substrate, comprising:
a circuit board;
a plurality of light-emitting devices disposed on the circuit board;
a reflective layer disposed on the circuit board, wherein the reflective layer is provided with a plurality of openings therein, and a light-emitting device in the plurality of light-emitting devices is located in an opening in the plurality of openings;
a support layer disposed on a side of the circuit board away from the reflective layer,
a barrier wall disposed on a surface of the reflective layer away from the circuit board, wherein an orthographic projection of the barrier wall on the circuit board is located within an orthographic projection of the reflective layer on the circuit board, and the barrier wall defines a plurality of sub-regions; and
an encapsulation layer disposed on a side of the circuit board away from the support layer and covering at least the plurality of light-emitting devices.

2. The light-emitting substrate according to claim 1, wherein a material of the support layer and a material of the reflective layer are same; and/or a thickness of the support layer and a thickness of the reflective layer are substantially same.

3. The light-emitting substrate according to claim 1, wherein a thickness of the reflective layer is in a range of 40 μm to 60 μm, inclusive, and a thickness tolerance of the reflective layer is in a range of −2 μm to 2 μm, inclusive; and/or a thickness of the support layer is in a range of 40 μm to 60 μm, inclusive, and a thickness tolerance of the support layer is in a range of −2 μm to 2 μm, inclusive.

4. The light-emitting substrate according to claim 1, wherein the encapsulation layer includes a plurality of encapsulation portions arranged at intervals, each encapsulation portion is located in a sub-region in the plurality of sub-regions, and a surface of the encapsulation portion away from the circuit board is substantially flush with a surface of the barrier wall away from the circuit board.

5. The light-emitting substrate according to claim 4, wherein the encapsulation layer further includes an encapsulation sub-layer, the encapsulation sub-layer is disposed on a side of the plurality of encapsulation portions away from the circuit board, and the encapsulation sub-layer covers the plurality of encapsulation portions and the barrier wall.

6. The light-emitting substrate according to claim 1, wherein the barrier wall includes a plurality of first sub-portions that extend along a first direction and are arranged at intervals along a second direction, and the first direction and the second direction intersect.

7. The light-emitting substrate according to claim 6, wherein the barrier wall further includes a plurality of second sub-portions that extend along the second direction and are arranged at intervals along the first direction.

8. The light-emitting substrate according to claim 1, wherein a reflectivity of the barrier wall is greater than or equal to 85%.

9. The light-emitting substrate according to claim 8, wherein a material of the barrier wall includes white adhesive and/or plastic.

10. The light-emitting substrate according to claim 1, wherein the circuit board includes a base, and circuit traces and a plurality of pads that are disposed on the base, at least two pads in the plurality of pads are located in the opening in the reflective layer.

11. A method for manufacturing a light-emitting substrate, the method comprising:
fabricating a circuit board;
synchronously forming a reflective film and a support layer on two opposite sides of the circuit board, respectively; and
patterning the reflective film such that a plurality of openings are formed in the reflective film to form a reflective layer, and
after patterning the reflective film such that the plurality of openings are formed in the reflective film to form the reflective layer, the manufacturing method further comprising:
arranging light-emitting devices in the openings;
forming a barrier wall on the reflective layer, the barrier wall dividing the reflective layer into a plurality of sub-regions; and
forming a plurality of encapsulation portions on a side of the circuit board away from the support layer, wherein each encapsulation portion is located in a sub-region in the plurality of sub-regions, and a surface of the encapsulation portion away from the circuit board is substantially flush with a surface of the barrier wall away from the circuit board.

12. The method for manufacturing the light-emitting substrate according to claim 11, wherein synchronously forming a reflective film and a support layer on two opposite sides of the circuit board, respectively, includes:
pressing the reflective film and the support layer with the circuit board by a lamination process.

13. The method for manufacturing the light-emitting substrate according to claim 12, wherein pressing the reflective film and the support layer with the circuit board by the lamination process, includes:
providing two films to be pressed, the two films to be pressed each including a substrate, and a first protective film and a second protective film that are disposed on two opposite sides of the substrate, respectively;
removing first protective films of the two films to be pressed;
synchronously pressing the two films to be pressed whose first protective films are removed on the two opposite sides of the circuit board, respectively, so that two substrates of the two films to be pressed are bonded with the circuit board; and
removing second protective films of the two films to be pressed; in the two substrates bonded with the circuit board, one substrate forms the reflective film, and another substrate forms the support layer.

14. A method for manufacturing a light-emitting substrate, the method comprising:
fabricating a circuit board;
synchronously forming a reflective film and a support layer on two opposite sides of the circuit board, respectively; and
patterning the reflective film such that a plurality of openings are formed in the reflective film to form a reflective layer;
wherein synchronously forming a reflective film and a support layer on two opposite sides of the circuit board, respectively, includes:

pressing the reflective film and the support layer with the circuit board by a lamination process;

wherein pressing the reflective film and the support layer with the circuit board by the lamination process, includes:

providing two films to be pressed, the two films to be pressed each including a substrate, and a first protective film and a second protective film that are disposed on two opposite sides of the substrate, respectively;

removing first protective films of the two films to be pressed;

synchronously pressing the two films to be pressed whose first protective films are removed on the two opposite sides of the circuit board, respectively, so that two substrates of the two films to be pressed are bonded with the circuit board; and removing second protective films of the two films to be pressed; in the two substrates bonded with the circuit board, one substrate forms the reflective film, and another substrate forms the support layer.

15. The method for manufacturing the light-emitting substrate according to claim 14, wherein before providing the two films to be pressed, the manufacturing method further comprises:

fabricating the two films to be pressed, wherein fabricating each film to be pressed includes: providing the first protective film and the second protective film; forming the substrate on the first protective film; and pressing the first protective film, the substrate and the second protective film by a lamination process.

16. The method for manufacturing the light-emitting substrate according to claim 11, wherein in a process for forming the plurality of encapsulation portions on the side of the circuit board away from the support layer, an encapsulation sub-layer is further formed; the encapsulation sub-layer is disposed on a side of the plurality of encapsulation portions away from the circuit board, and the encapsulation sub-layer covers the plurality of encapsulation portions and the barrier wall.

17. A backlight module, comprising:

the light-emitting substrate according to claim 1, wherein the light-emitting substrate has a light exit side and a non-light exit side that are opposite; and a plurality of optical films disposed on the light exit side of the light-emitting substrate.

18. A display apparatus, comprising:

the backlight module according to claim 17; and a display panel disposed on a side, away from the light-emitting substrate, of the plurality of optical films of the backlight module.

19. The method for manufacturing the light-emitting substrate according to claim 14, wherein synchronously pressing the two films to be pressed whose first protective films are removed on the two opposite sides of the circuit board, respectively, so that the two substrates of the two films to be pressed are bonded with the circuit board, includes:

placing the circuit board between the two films to be pressed whose first protective films are removed;

synchronously pre-pressing and attaching the circuit board and the two substrates of the two films to be pressed; and synchronously pressing the circuit board and the two substrates on two sides thereof that have been pre-pressed and attached in vacuum.

* * * * *

UNITED STATES PATENT AND TRADEMARK OFFICE
CERTIFICATE OF CORRECTION

PATENT NO. : 12,298,621 B2  
APPLICATION NO. : 18/247394  
DATED : May 13, 2025  
INVENTOR(S) : Bing Zhang et al.

Page 1 of 1

It is certified that error appears in the above-identified patent and that said Letters Patent is hereby corrected as shown below:

In the Claims

Column 17, Line 17, Claim 1, "away from the reflective layer," should read -- away from the reflective layer; --.

Column 18, Line 14, Claim 11, "a reflective layer," should read -- a reflective layer; --.

Signed and Sealed this  
Thirtieth Day of September, 2025

John A. Squires  
*Director of the United States Patent and Trademark Office*